United States Patent
Lundgard et al.

(10) Patent No.: US 6,512,024 B1
(45) Date of Patent: Jan. 28, 2003

(54) CONTINUOUS PROCESS OF EXTRUDING AND MECHANICALLY DISPERSING A POLYMERIC RESIN IN AN AQUEOUS OR NON-AQUEOUS MEDIUM

(75) Inventors: Richard A. Lundgard, Midland, MI (US); James E. Pate, III, Sanford, MI (US); Christian Piechocki, Marienthal (FR); Peter T. Keillor, III, Lake Jackson, TX (US); Nanette E. Lutenske, Bay City, MI (US); Ira Thumma, Shepherd, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/574,926

(22) Filed: May 19, 2000

Related U.S. Application Data

(60) Provisional application No. 60/135,086, filed on May 20, 1999.

(51) Int. Cl.$^7$ ................................................... C08J 3/05
(52) U.S. Cl. ........................ 523/335; 523/402; 524/585; 524/586; 524/840
(58) Field of Search ................................. 524/585, 586, 524/840; 523/402, 335; 204/489

(56) References Cited

U.S. PATENT DOCUMENTS

| | | | |
|---|---|---|---|
| 4,612,156 A | 9/1986 | Heinemeyer et al. | |
| 4,879,322 A | 11/1989 | Markusch et al. | |
| 5,114,552 A | 5/1992 | McCollum et al. | |
| 5,539,021 A | * 7/1996 | Pate | 523/335 |
| 5,834,078 A | 11/1998 | Cavitt et al. | |
| 5,959,032 A | 9/1999 | Evans et al. | |
| 6,204,310 B1 | 3/2001 | Choudhery | 523/348 |

FOREIGN PATENT DOCUMENTS

| | | | |
|---|---|---|---|
| GB | 2127829 | * | 4/1984 |
| JP | Hei11-80602 | | 3/1999 |
| WO | WO 97/45476 | | 12/1997 |
| WO | WO 98/27141 A2 | | 6/1998 |

* cited by examiner

*Primary Examiner*—Robert Dawson
*Assistant Examiner*—D. Aylward

(57) ABSTRACT

Stable aqueous dispersions or emulsions can be prepared by merging into a mechanical disperser a stream of a molten or liquid disperse phase with a stream of a molten or liquid continuous phase to form a dispersion or emulsion. The molten or liquid disperse phase stream contains a polymer that is preferably a solid at room temperature, but molten at some advanced temperature. The polymer is formed in a molten state or formed and melted by a continuous reaction process such as an extrusion process, including melt extrusion or compound extrusion. It has been discovered that low polydisperse submicron sized dispersion can be prepared by the method of the present invention.

19 Claims, 1 Drawing Sheet

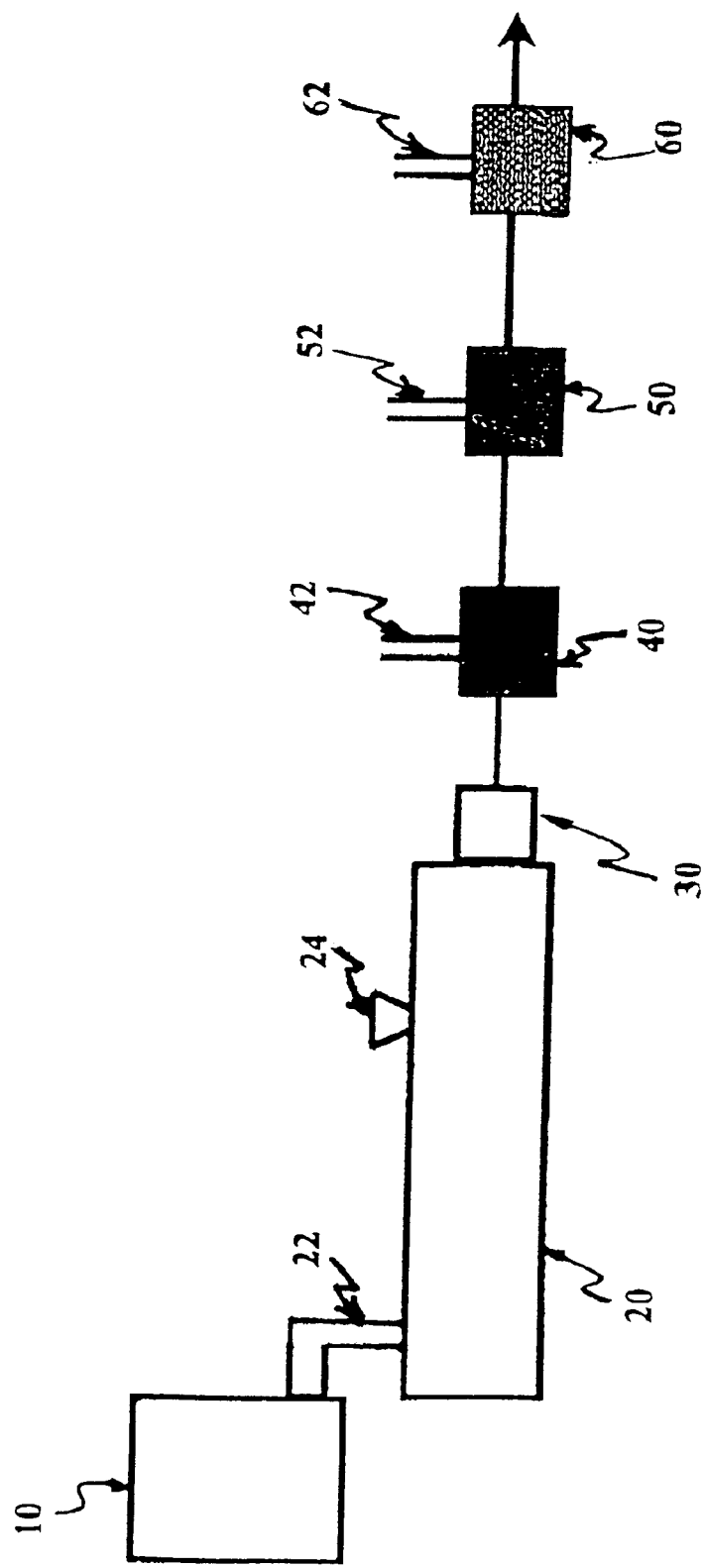

CONTINUOUS PROCESS OF EXTRUDING AND MECHANICALLY DISPERSING A POLYMERIC RESIN IN AN AQUEOUS OR NON-AQUEOUS MEDIUM

CROSS REFERENCE STATEMENT

This application claims the benefit of U.S. Provisional Application No. 60/135,086, filed on May 20, 1999.

BACKGROUND OF THE INVENTION

The present invention relates to a continuous process of extruding and mechanically dispersing a polymeric resin in an aqueous or non-aqueous medium.

Stable aqueous dispersions of polyepoxide-amine resins that are ionically charged are known. Such resins are described, for example, by McCollum et al. in U.S. Pat. No. 5,114,552, incorporated herein by reference. McCollum et al. discloses that an organic polyepoxide can be rendered cationic by reaction with a primary or secondary amine in the presence of acid to form cationically charged acid salt groups, or by reaction with tertiary amines to form quaternary ammonium salts. These resins are also crosslinkable by virtue of the incorporation of pendant hydroxyl groups or primary or secondary amine groups, which are reactive with a capped polyisocyanate crosslinker. The crosslinked resin is dispersed in an acidified aqueous medium, and the solids content is adjusted with the further addition of water. The extent of cationic salt formation is preferably selected so that a stable dispersion of the cationic polymer is formed, although an external cationic surfactant can also be added. Such stable aqueous dispersions are useful as curable electrocoating compositions.

The preparation described by McCollum et al. is time-consuming because it is carried out in a batch reactor. Furthermore, the reaction requires considerable amounts of organic solvent, which have to be removed.

The preparation of thermoplastic epoxy resins by continuous processes are known. For example, U.S. Pat. No. 4,612,156, incorporated herein by reference, describes the preparation of a high molecular weight phenoxy resin by mixing a diepoxy compound (e.g., a diglycidyl ether of bisphenol A) with a difunctional compound that reacts with the epoxy groups (e.g., bisphenol A) in the presence of a catalyst, and feeding the mixture into a twin screw reactive extruder by way of a single screw extruder or a pump, thus forming an epoxy resin having a weight average molecular weight of about 30,000 Daltons. Such a resin can be ground and sieved, then dispersed in water in the presence of a surfactant to form an aqueous dispersion (sometimes referred to as a powder slurry) which is useful in coating applications.

It would therefore be an advance in the art to be able to prepare a stable aqueous dispersion of a resinous material in a continuous process directly from an extruder without first having to solidify, then grind, then sieve the resin. It would be a further advance in the art to form curable electrocoating dispersions by a continuous method that requires little or no ancillary solvent.

SUMMARY OF THE INVENTION

The present invention addresses the problems in the art by providing a continuous method for preparing a stable dispersion or emulsion comprising the step of merging into a mechanical disperser a stream of a molten or liquid disperse phase containing a polymer with a stream of a molten or liquid continuous phase to form a dispersion or an emulsion, wherein a) the continuous phase is substantially immiscible with the disperse phase; and
b) the polymer is self-dispersable or either the disperse phase or the continuous phase or both contains a stabilizing amount of a surfactant; and
c) the polymer is continuously extruded in an extruder that is coupled to the mechanical disperser.

In another aspect, the present invention is a method of preparing a high internal phase ratio emulsion without phase inversion comprising the steps of:

a) continuously merging into a disperser a continuous phase liquid stream having a flow rate of $R_1$ and a disperse phase liquid stream having a flow rate of $R_2$; and
b) mixing the merged streams in the substantial absence of a surfactant and at a mixing rate sufficiently constant to form the high internal phase ratio emulsion without phase inversion;

wherein the disperse phase liquid stream contains a self-dispersing polymer or prepolymer and wherein $R_2:R_1$ is such that the mean volume average particle size of the high internal phase ratio emulsion is less than 2 $\mu$m or the polydispersity is less than 2.

The process of the present invention provides a means of preparing a stable aqueous dispersion or emulsion by a continuous process wherein an extruder is coupled to a continuous mechanical dispersion process.

BRIEF DESCRIPTION OF DRAWING

FIG. 1 is a schematic of the preferred method of the present invention. A twin screw extruder 20 is coupled in series and in the order stated to a gear pump 30, a disperser 40, a first dilution mixer 50 and optionally a second dilution mixer 60. Resin in the form of powder or flakes is fed from the feeder 10 to an inlet 22 of the extruder 20 where the resin is melted or compounded. Where the resin is not self-dispersing, surfactant is advantageously added to the resin through a separate inlet 24 of the twin screw extruder 20. The resin melt is then delivered to the gear pump 30 and merged with an initial stream of water flowing through a conduit 42 in the disperser 40. Surfactant may be added additionally or exclusively to the water stream, but it is preferred to add surfactant to a resin that is not self-dispersing at a separate inlet 24 of the twin screw extruder. After the streams are merged, the water/resin dispersion is diluted with additional water using a dilution mixer 50, and optionally diluted again in a second dilution mixer 60. Significantly, water is not added into the twin screw extruder 20 but rather to a stream containing the resin melt after the melt has exited from the extruder. In this manner, steam pressure build-up in the extruder 20 is eliminated.

DETAILED DESCRIPTION OF THE INVENTION

Stable dispersions or emulsions can be prepared by merging into a mechanical disperser a stream of a molten or liquid disperse phase with a stream of a molten or liquid continuous phase to form a dispersion or emulsion. The molten or liquid disperse phase stream contains a polymer that is preferably a solid at room temperature, but molten at some higher temperature. The polymer is formed in a molten state or formed and melted by a continuous process such as an extrusion or melt kneading process. Examples of extrusion processes include melt extrusion and compound extrusion.

In melt extrusion, a pre-formed polymer, generally in the form of flakes or pellets, is delivered to an extruder to melt the polymer. The melt exits the exit port of the extruder, and sent through a heated conduit, thus becoming the stream of the molten polymer. This stream is coupled to the continuous phase stream and ultimately a mechanical disperser. If it is desired to introduce fillers, stabilizers, pigments, or other non-reacting compounds to the disperse phase stream, such additions are advantageously done prior to extruding and the components are blended by way of compound extruding.

Examples of polymeric resins include epoxy resins, poly (hydroxyaminoether) resins (PHAEs, as described in U.S. Pat. No. 5,834,078, which teachings are incorporated herein by reference), polyurethane resins, polyurethane-urea resins, polyester resins, polyolefins, ethylene-acrylic acid copolymers, or mixtures thereof or hybrids thereof. The polymer may additionally contain ionic charges as described by McCollum et al. The polymer may require external surfactant, which may be anionic, cationic, or nonionic, or combinations of nonionic and anionic or nonionic and cationic surfactants. The polymer may be self-dispersing by virtue of the presence of ionic groups, potentially ionic groups such as carboxylic acids and amines, or hydrophilic nonionic groups as described by Markusch et al. in U.S. Pat. No. 4,879,322, column 9, lines 61–68, and columns 10–12. In some instances, it may be desirable to disperse the resins in the substantial absence of an external surfactant. As used herein, substantial absence means less than 0.1 percent of an external surfactant.

External surfactant, where required, can be added a) to the disperse phase; b) to the continuous phase; or c) to both. Generally, it is preferable to add surfactant to the disperse phase upstream of the disperser, more preferably through an inlet of the extruder as described in FIG. 1.

The molten or liquid continuous phase can be organic- or aqueous-based, and is preferably aqueous-based. The continuous phase and the disperse phase are substantially immiscible with each other so that stable dispersions or emulsions can be formed. Examples of a dispersion that contains a non-aqueous-based continuous phase is ethylene-acrylic acid in a polyether polyol and a polyolefin in a polyether polyol stabilized by a surfactant that contains structural units compatible with both the polyolefin and the polyol. Such a surfactant can be prepared by reacting a polyolefin grafted with maleic anhydride or the half ester of maleic anhydride with a Jeffamine™ monoamine polyol (a trademark of Huntsman Chemical). Thus, a suitable surfactant (or compatibilizer) for polyethylene and polyether polyol can be prepared by reacting polyethylene grafted with from about 0.1 to about 10 weight percent of maleic anhydride or its half ester with a monoamine polyol. Examples of preferred monoamine polyols include Jeffamine M-2005 described by Evans et al. in U.S. Pat. No. 5,959,032, which teachings are incorporated herein by reference. The resin melt or liquid that has exited from the extruder forms the disperse phase stream, which is merged with the continuous phase stream, then delivered to a mechanical disperser. The ratio of the flow rate of the stream of the disperse phase ($R_2$) to the flow rate of the stream of the continuous phase ($R_1$) is advantageously set to minimize the polydispersity and the particle size of the stable aqueous dispersion. A description on how to form low particle size, low polydisperse stable emulsions and dispersions by a process of merging a stream containing a disperse phase with a stream containing a continuous phase is described by Pate et al. in U.S. Pat. No. 5,539,021, incorporated herein by reference. Preferably, $R_2$:$R_1$ is in such a range that the volume average particle size is less than $2\mu$ and the polydispersity is less than 2.

As Pate et al. discloses, it is desirable to prepare a high internal phase ratio emulsion (or, if the disperse phase solidifies out, a high internal phase dispersion) wherein the volume:volume ratio of the disperse phase to continous phase is at least 74/26. In the case where water is the continuous phase, the high internal phase ratio emulsion is advantageously diluted with water to form a stable aqueous emulsion or dispersion. Such dispersions are suitable for coating applications; if the dispersion is ionically charged, the dispersions are particularly useful for electrocoating applications.

The following examples are for illustrative purposes only and are not intended to limit the scope of this invention.

EXAMPLE 1

Dispersion of Epoxy Resin (1-Type) Formulation in Water

The dispersion of a 1-type epoxy resin (Dow RTC 30240.22) in water was accomplished in a continuous hybrid disperser. The system included a twin screw extruder to melt and forward the epoxy resin at 70° C. as well as to mix in the surfactant necessary to stabilize the dispersion. Thus, the above epoxy resin was fed at 25 g/min to the twin screw extruder while a surfactant mixture was added into the barrel of the extruder at a rate of 4.6 g/min. The surfactant consisted of a mixture of DISPONIL® TA-430 surfactant (trademark of Henkel), ATSURF® 108 surfactant (a trademark of ICI Surfactants), and AEROSOL® OT-75 (a trademark of Cytec Industries) in a ratio of 40/42/10 by weight. After exiting the extruder at the rate of 29.6 g/min the resin/surfactant mixture was merged with a stream of water flowing at a rate of 5 mL/min at 75° C. The merged streams were fed into the inlet of a rotor-stator disperser (E. T. Oakes, N.Y.). The resulting dispersion, flowing at the rate of 34.6 g/min was then merged with a second stream of water flowing at the rate 40 mL/min. The combined streams were fed into a centrifugal pump mixer to dilute the dispersion to the 40 percent solids level. A sample was collected and its particle size found to be 0.40 $\mu$m with a polydispersity (the ratio of the volume average diameter to the number average diameter of the particles) of 1.17.

EXAMPLE 2

Dispersion of Epoxy Resin (2-Type) Formulation in Water

Using the equipment described in Example 1, a dispersion of an epoxy resin blend was prepared in a continuous manner. The resin blend consisted of a mixture of 74.1 percent of a 2-type epoxy resin (Dow DER 692, equivalent weight 690), 24.4 percent of an epoxy/phenolic hardener (DEH 84), 0.8 percent benzoin (Aldrich Chemical), and 0.7 percent RESIFLOW® P67 flow control agent (a trademark of Estron Chemical). The blend was fed to the extruder at a rate of 60 g/min and combined with 26.1 g/min of a mixture of DISPONIL TA-430 and ATSURF 108 surfactants (53/47 percent by weight). After exiting from the extruder, the 100° C. molten feed was merged at the rate of 86.1 g/min with an initial aqueous stream of water flowing at 31.4 mL/min merged with a stream of AEROSOL TO-75 surfactant flowing at the rate of 2.8 mL/min (so that the total rate of the initial water stream and the surfactant stream merged that was with the molten feed stream is 34.2 mL/min) prior to being fed into the inlet of the Oakes disperser at 95° C. Upon exiting the disperser, additional water was added upstream of the centrifugal mixer to dilute the dispersion to 48 percent solids. The resulting dispersion had a volumetric particle size of 0.87 $\mu$m and a polydispersity of 2.6.

EXAMPLE 3

Dispersion of an Epoxy/Polyester hybrid Resin Formulation in Water

Using the equipment described in example 2 above, a dispersion of an epoxy resin blend was prepared in a continuous manner. The resin blend consisted of a mixture of 51.3 percent of a 2-type epoxy resin (Dow DER 6224, equivalent weight 707) and 48.7 percent of a polyester resin (DSM, Uralac P-5598, equivalent weight 739). The blend was fed to the extruder at a rate of 50 g/min and combined with 7.7 g/min of a mixture of DISPONIL OT-41 and ATSURF 108 (53/47 percent by wt) surfactants. The 120° C. molten feed exited the extruder and was merged with a stream containing water and surfactant flowing at a rate of 11.5 mL/min (formed by merging an initial aqueous stream of water flowing at the rate of 10 mL/min and a stream of AEROSOL OT-75 surfactant flowing at the rate 1.5 mL/min). The merged streams were then fed into the inlet of the Oakes disperser at 120° C. Upon exiting the disperser, additional water was added upstream of the centrifugal mixer to dilute the dispersion to 44 percent solids. The resulting dispersion had a volumetric particle size of 5.8 µm and a polydispersity of 1.8.

EXAMPLE 4

Dispersion of Ethylene-Acrylic Acid Copolymer (EAA) in Polyether Polyol

A dispersion of Primacor® EAA in Voranol® polyether polyol was demonstrated using a continuous hybrid disperser system in which a single screw extruder was coupled to a centrifugal pump based disperser. The polymer melt exited the extruder at a rate of 10.7 g/min and a temperature of approximately 130° C. and was merged with a stream of hot liquid polyether polyol flowing at the rate of 35 g/min. The merged streams were flowed to a centrifugal pump to disperse the polymer into the polyol. Upon exiting the mixer, the product was collected and analyzed for particle size using a Coulter LS-230 particle size analyzer. The overall volume average particle size was 4.2 µm, with a polydispersity of 6.4.

EXAMPLE 5

Dispersion of an Epoxy/Polyester Hybrid Resin Formulation in Water

Using the equipment described in example 2 above, a dispersion of an epoxy resin blend was prepared in a continuous manner. The resin blend consisted of a mixture of 51.3 percent of a 2-type epoxy resin (Dow DER 6224, equivalent weight 707) and 48.7 percent of a polyester resin (DSM, Uralac P-5598, equivalent weight 739). The blend was fed into the extruder at a rate of 50 g/min and ATSURF 108 surfactant (2.5 g/min) was added to the extruder through a separate inlet. The resin feed and ATSURF 108 surfactant extrudate were fed to the disperser at a temperature of 80° C. to 105° C. Meanwhile, the sodium salt of dodecyl benzenesulfonic acid was added to the water phase upstream of the disperser at a rate of 0.5 g/min. The water/anionic surfactant phase was fed into the disperser at a rate of 25 g/min and merged with the extrudate flowing at a rate of 52.5 g/min. The resultant high solids dispersion stream, flowing at a rate of 77.5 g/min was further diluted in a dilution mixer with water flowing at a rate of 20 g/min to form a dispersion having solids content of 54%. The resulting dispersion had a volumetric particle size of 1.3 µm and a polydispersity of 1.5.

What is claimed is:

1. A continuous method for preparing a stable dispersion or emulsion comprising the step of merging into a mechanical disperser a stream of a molten or liquid disperse phase containing a polymer with a stream of a molten or liquid continuous phase to form a dispersion or an emulsion, wherein
   a) the continuous phase is substantially immiscible with the disperse phase; and
   b) the polymer is self-dispersable or either the disperse phase or the continuous phase or both contains a stabilizing amount of a surfactant; and
   c) the polymer is continuously extruded in an extruder that is coupled to the mechanical disperser.

2. The method of claim 1 wherein the continuous phase is water or a polyether polyol.

3. The method of claim 1 wherein the polymer is continuously extruded by:
   a) a compound extrusion process wherein other additives are blended with the polymer; or
   b) a melt extrusion process.

4. The method of claim 3 wherein the disperse phase contains an epoxy resin, a polyester, a polyurethane resin, polyolefin, or an ethylene-acrylic acid copolymer, or a mixture thereof or a hybrid thereof.

5. The method of claim 4 wherein the disperse phase contains an epoxy resin and a hardener and the continuous phase contains water.

6. The method of claim 4 wherein the disperse phase contains a polyethylene, the continuous phase contains a polyether polyol and the polyethylene and the polyether polyol are stabilized by a stabilizing amount of a surfactant prepared by reacting a polyolefin grafted with maleic anhydride or a half ester of maleic anhydride with a monoamine polyol.

7. The method of claim 4 wherein a catalyst and a hardener are added to the stream of the molten polymer disperse phase prior to merging the disperse phase stream with the continuous phase stream.

8. The method of claim 3 wherein the continuous phase contains water and the polymer is ionically charged or contains groups that can be rendered ionic by the presence of acid or base in the continuous phase.

9. The method of claim 8 wherein the polymer is ionically charged.

10. The method of claim 8 wherein the polymer contains carboxylic acid groups and the continuous phase contains water and sufficient base to neutralize a sufficient portion of the acid groups to render the polymer electrodepositable.

11. The method of claim 8 wherein the polymer contains amine groups and the continuous phase contains water and sufficient acid to neutralize a sufficient portion of the amine groups to render the polymer electrodepositable.

12. The method of claim 8 wherein the polymer is ionically charged with carboxylate groups or quaternary ammomium salt groups or amine salt groups.

13. The method of claim 8 which further includes the step of depositing a portion of the stable aqueous dispersion or emulsion onto an electrically conductive surface.

14. A method of preparing a high internal phase ratio emulsion without phase inversion comprising the steps of:
   a) continuously merging into a disperser a continuous phase liquid stream at a flow rate of $R_1$ and a disperse phase liquid or molten stream having a flow rate of $R_2$; and
   b) mixing the merged streams in the substantial absence of an external surface active agent and at a mixing rate sufficiently constant to form the high internal phase ratio emulsion without phase inversion;

wherein the disperse phase liquid stream contains a self-dispersing polymer or prepolymer and wherein $R_2:R_1$ is such that the mean volume average particle size of the high internal phase ratio emulsion is less than 2 μm or the polydispersity is less than 2.

15. The method of claim 14 wherein the disperse phase liquid stream contains an ethylene-acrylic acid copolymer or a neutralized salt thereof and the continuous phase liquid stream contains a polyether polyol.

16. The method of claim 14 wherein the disperse phase liquid stream contains an epoxy resin, a polyester, a polyurethane, or a combination thereof, or a hybrid thereof, which resins have been rendered self-dispersing by the chemical incorporation of ionic or nonionic hydrophilic groups.

17. The method of claim 14 wherein the disperse phase liquid stream contains a diisocyanate-terminated polyurethane prepolymer which is rendered self-dispersing by the chemical incorporation of ionic or hydrophilic groups.

18. A method of preparing a high internal phase ratio emulsion without phase inversion comprising the steps of:

a) continuously merging into a disperser a continuous phase liquid stream at a flow rate of $R_1$ and a disperse phase liquid or molten stream having a flow rate of $R_2$; and b) mixing the merged streams in the substantial absence of an external surface active agent and at a mixing rate sufficiently constant to form the high internal phase ratio emulsion without phase inversion;

wherein the disperse phase liquid stream contains a self-dispersing polymer or prepolymer which is an ethylene-acrylic acid copolymer, a neutralized salt of an ethylene-acrylic acid copolymer, a polyester, a polyurethane, a diisocyanate-terminated polyurethane prepolymer, or a combination thereof, and wherein $R_2:R_1$ is such that the mean volume average particle size of the high internal phase ratio emulsion is less than 2 μm or the polydispersity is less than 2.

19. The method of claim 18 wherein the disperse phase liquid stream contains an ethylene-acrylic acid copolymer or a neutralized salt thereof and the continuous phase liquid stream contains a polyether polyol.

* * * * *